US006269184B1

(12) United States Patent
Spaulding et al.

(10) Patent No.: US 6,269,184 B1
(45) Date of Patent: Jul. 31, 2001

(54) METHOD AND APPARATUS FOR INTERACTIVE COLOR TRANSFORMATION OF COLOR VALUES BETWEEN COLOR SPACES

(75) Inventors: Kevin Edward Spaulding, Spencerport, NY (US); Ron Gershon, Rehovat (IL); Richard N. Ellson, Rochester; James R. Sullivan, Spencerport, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/866,469

(22) Filed: May 30, 1997

Related U.S. Application Data

(63) Continuation of application No. 08/217,785, filed on Mar. 24, 1994, now abandoned.

(51) Int. Cl.[7] .................................................. G06K 9/00

(52) U.S. Cl. ........................... 382/167; 345/431; 358/518

(58) Field of Search .................................. 382/167, 162; 395/131; 358/518, 520, 521, 523; 345/431

(56) References Cited

U.S. PATENT DOCUMENTS

| 4,096,523 | 6/1978 | Belmares-Sarabia et al. ........ 358/80 |
| 4,500,919 | 2/1985 | Schreiber ............................. 358/78 |
| 4,577,219 | 3/1986 | Klie et al. ............................ 358/78 |
| 4,689,669 | 8/1987 | Hoshino et al. ..................... 358/80 |
| 4,794,382 | 12/1988 | Lai et al. ............................ 340/703 |
| 4,857,994 | 8/1989 | Belmares-Sarabia et al. ........ 358/22 |
| 4,893,181 | 1/1990 | Yeomans ............................. 358/80 |
| 4,941,039 | 7/1990 | D'Erico ............................... 358/80 |
| 5,081,529 | * 1/1992 | Collette .............................. 382/167 |
| 5,103,407 | 4/1992 | Gabor ................................. 395/181 |
| 5,119,186 | 6/1992 | Deacon et al. ...................... 358/78 |
| 5,155,588 | 10/1992 | Levien ................................. 358/80 |
| 5,164,822 | 11/1992 | Muramatsu ......................... 358/75 |
| 5,208,911 | * 5/1993 | Newman et al. .................... 358/518 |
| 5,212,546 | 5/1993 | Arazi et al. ......................... 358/80 |
| 5,218,671 | 6/1993 | Liao et al. ......................... 395/131 |
| 5,267,030 | * 11/1993 | Giorgianni et al. ................ 358/518 |
| 5,295,204 | * 3/1994 | Parulski ............................. 382/167 |
| 5,335,097 | * 8/1994 | Murakami ......................... 358/518 |
| 5,337,166 | * 8/1994 | Ikegami ............................. 358/518 |
| 5,341,464 | * 8/1994 | Friedman et al. .................. 395/131 |
| 5,377,013 | * 12/1994 | Oka et al. .......................... 358/332 |
| 5,384,901 | * 1/1995 | Glassner et al. ................... 395/131 |
| 5,414,537 | * 5/1995 | Omuro et al. ..................... 358/518 |
| 5,416,890 | * 5/1995 | Beretta ............................... 395/131 |

FOREIGN PATENT DOCUMENTS

| 0 481 525 | 4/1992 | (EP) . |
| 0 488 656 | 5/1992 | (EP) . |
| 0 546 773 | 6/1993 | (EP) . |
| 0 566 914 | 10/1993 | (EP) . |
| 92/20184 | 12/1992 | (WO) . |

OTHER PUBLICATIONS

R.S. Gentile, E. Walowit, and J.P. Allebach, "A Comparison of Techniques for Color Gamut Mismatch Compensation", *Journal of Imaging Technology*, vol. 16, No. 5, Oct. 1990, pp. 176–181.

Katsuhiro Kanamori and Hiroaki Kotera, "Color Correction Technique for Hard Copies by 4–Neighbors Interpolation Method", *Journal of Imaging Science and Technology*, vol. 36, No. 1, Jan./Feb. 1992, pp. 73–80.

(List continued on next page.)

*Primary Examiner*—Bhavesh Mehta
(74) *Attorney, Agent, or Firm*—David M. Woods

(57) ABSTRACT

A method and apparatus for mapping a first color space into a second color space which allows a user to specify or constrain the mapping for a subset of the points within the first color space and determine the remaining unconstrained points according to a preexisting or default mapping.

19 Claims, 4 Drawing Sheets

OTHER PUBLICATIONS

Thaddeus Beier and Shawn Neely, "Feature–Based Image Metamorphosis", *Computer Graphics*, vol. 26, No. 2, Jul. 1992.

U.S. application No. 08/017,094, Ellson et al., filed Feb. 12, 1993.

U.S. application No. 08/017,198, Spaulding et al., filed Feb. 12, 1993.

U.S. application No. 08/068,823, Wan et al., filed May 28, 1993.

* cited by examiner

METHOD AND APPARATUS FOR INTERACTIVE COLOR TRANSFORMATION OF COLOR VALUES BETWEEN COLOR SPACES

This is a Continuation of application Ser. No. U.S. 08/217,785, filed Mar. 24 1994, now abandoned.

The present application is related to U.S. application Ser. No. 08/017,094 filed Feb. 12, 1993, now abandoned entitled Method For Cross-Device Color Calibration And Enhancement Using Explicit Constraints and having U.S. application Ser. No. 08/017,198 filed Feb. 12, 1993, now abandoned entitled Method And Associated Apparatus For Transforming Input Color Values In An Input Color Space To Output Color Values In An Output Color Space and all incorporated by reference herein.

BACKGROUND OF THE INVENTION

1. Field of the Invention

The present invention is directed to color calibration and color enhancement for digital imaging systems in which interactive mapping of colors in one color space to colors in another color space is performed and, more particularly, to a system in which constraints to the mapping process are supplied by a user via an interactive system used to specify a partial color mapping for some subset of the colors.

2. Description of the Related Art

In many applications, it is necessary to take color image data which exists in a color space for one specific device and map it onto a color space for a different device. Because of the differences in the color spaces and the color gamuts of the various devices, several problems arise in this process. The first is color calibration which involves how to specify the color on one device so that the perceived color matches that of another device. For example, an image displayed on a video monitor needs to be printed with the same perceived color reproduction. This problem is essentially one of transforming from one device dependent color space to another. For example, this would involve transforming from the monitor RGB space to the printer CMY(K) space. If all of the colors in the image fall within both color gamuts, then this transformation is straightforward and can be accomplished with multi-dimensional look-up-tables (see W. F. Schreiber, Color Reproduction System, U.S. Pat. No. 4,500, 919 (Feb. 19, 1985)).

When some of the colors in the input color space fall outside of the gamut of the output color space the problem is more complicated. Now the question becomes what to do with the out-of-gamut colors. Several methods to handle this problem have been proposed. Common approaches maintain the hue angle and lightness for the out-of-gamut colors and clip the saturation to the gamut boundary, or they compress the gamut so that the input color gamut fits within the output color gamut (see R. S. Gentile et al.,"A comparison of techniques for color gamut mismatch compensation", J. Imaging Technol. 16, 176–181 (1990)). For many kinds of images, such as photographic scenes, where very few out-of-gamut colors will occur, saturation clipping approach may yield acceptable results. However, for other types of images, such as computer generated presentation graphics, a large percentage of the colors may be outside the gamut, since saturated colors hold great appeal for many kinds of graphics such as pie charts, or text slides. Using an approach which clips the saturation or compresses the gamut may yield quite unacceptable results since the resulting images will be noticeably lower in saturation. The colors appear more pastel and have less "snap". As a result, different techniques are needed to map the input color gamut into the output color space. This involves modifying the colors in the image rather than matching the colors from one device to another, which is referred to as "color enhancement".

A principle reason for the mismatch in gamut shapes for different devices is related to the difference in the primaries of the devices (i.e., the "blue" primary of the printer, which is created by combining cyan and magenta colorants, may differ in lightness, saturation, and even hue from the blue phosphor of the monitor). In many color enhancement approaches, specifying a mapping, which computes the amount of the colorants for the second device by a function of the corresponding colorants of the first device and which will achieve the desired effect on the primaries without having undesirable side effects on other colors, can be quite difficult or even impossible. For example, skin tones might end up turning greenish. A more robust approach defines some multi-dimensional color-mapping to transform the coordinates of the input space into the output space. This provides "knobs" to adjust the appearance of certain colors and/or control the amount of correction applied.

For some applications, other forms of color enhancement may also be desirable. For example, one might want to boost the saturation of a hazy image, adjust the hue of an object in the image, or increase the color contrast between different objects in the image. Such enhancement methods suffer from the same problems which were described above. In particular, it is difficult to modify some subset of the color gamut without having undesirable side effects on the rest of the color space (See "Method for cross-device color calibration and enhancement using explicit constraints" previously mentioned).

It is also desirable to allow for the explicit mapping of certain colors to be performed manually by users. Consider when certain corporate trademarks or logos have to maintain their colors, or when a product to be depicted in a print should have a certain color to it, i.e., chocolate should have a specific shade of brown. In such a situation the mapping process from input color values to output color values needs to have an interactive means which will enable user-selected color values to map to the user-selected output color values.

SUMMARY OF THE INVENTION

It is an object of the present invention to provide a system that allows a user to interactively specify a constrained mapping of colors in one color space into another color space.

It is another object of the present invention to allow the colors that are not constrained to be mapped by an unconstrained or otherwise specified method.

It is also an object of the present invention to allow a user to specify a mapping using a small number of point-to-point constraints to obtain a color transformation of images between spaces that satisfies the users subjective requirements.

It is a further object of the present invention to provide a system that allows the user to constrain the mapping only in regions of interest and to perform mapping in other regions without the explicit constraints.

The above objects can be attained by a system in which a user specifies a general mapping strategy for mapping color values in a first color space to values in a second color space, thereby specifying a general mapping or transform between the spaces. The user then interactively specifies modifications to the transform by specifying constraints in the transform. The constraints are specified by the user picking a color value in the first color space and picking a subjectively corresponding color in the second color space. The two colors specify a constrained mapping. That is, the general transform is modified so that colors in the input that fall on the constraint point in the first space are mapped to the selected point in the second space. The unconstrained color values initially specified by the general transform are modified to provide a smooth transition to the constrained points. The modified mapping or transformation can then be used to transform images in the first color space into images in the second color space.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention describes a method and apparatus for mapping one color space into another color space by allowing a user to interactively and explicitly specify the mapping for some subset of the points within the color space and determining the remaining unconstrained points according to a defined, general or preexisting mapping strategy or transformation. The user interactively specifies particular colors from the input color space to be mapped to particular specified colors in the output color space. This method improves on previous methods by providing for greater flexibility in the specification of explicit constraints, by allowing user selection of input colors and associated output colors. More specifically, the preferred method of the present invention is a method and associated apparatus for transforming input color values in an input color space to output color values in an output color space, comprising the steps of: a) specifying the input and output color spaces; b) providing the user with means to explicitly specify particular colors from the input color space and what colors in the output color space they should be mapped to; c) providing the user with the choice of using built-in transformations to be applied to single colors or sets of colors (such as maintaining the neutral colors, etc.); d) forming a transform of the remaining colors using the constraints provided in steps b) and c); and e) transforming input color values in the input color space to output color values in the output color space using the transforms formed in steps a) through d).

The advantages and implementation aspects of a generalized color mapping technique have been discussed in the Method For Cross-Device Color Calibration And Enhancement Using Explicit Constraints, and Method And Associated Apparatus For Transforming Color Values In An Input Color Space To Output Color Values In An Output Color Space both previously mentioned. These describe generating a multi-dimensional color transforming function which transforms the coordinates of the input space into those of the output space. The amount of Cyan colorant for a printer would then be a function of all of the color channels of the input device. In the transformation described therein, each of the output color values will be a function of all of the input color values. This can be represented functionally as:

$$D=f_D(A,B,C), E=f_E(A,B,C), F=f_F(A,B,C) \qquad (2)$$

Figure 1:
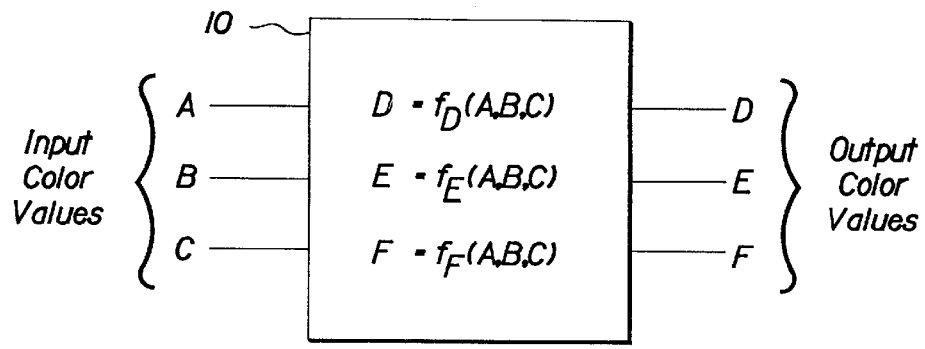
FIG. 1 illustrates the principles of generalized color mapping or transformation.

The color transformation functions $f_D$, $f_E$, and $f_F$ can be implemented using multi-dimensional look-up tables (with or without interpolation between the look-up table entries). This invention presents a more flexible approach to color mapping by providing a user-interface which enables users to input into the system the constraints for the mapping process. The interface is built into a generalized color mapping technique, like the one illustrated in FIG. 1 which depicts a generalized color mapping function 10 for transforming multi-channel input color values in a first or input color space denoted as ABC (where ABC could represent RGB, CMY, CMY(K), XYZ, CIELAB, etc.) into multi-channel output color values in a second or output color space denoted as DEF (where DEF could represent the same color spaces as listed above). The output color space may or may not be a different color space than the input color space.

Figure 2:
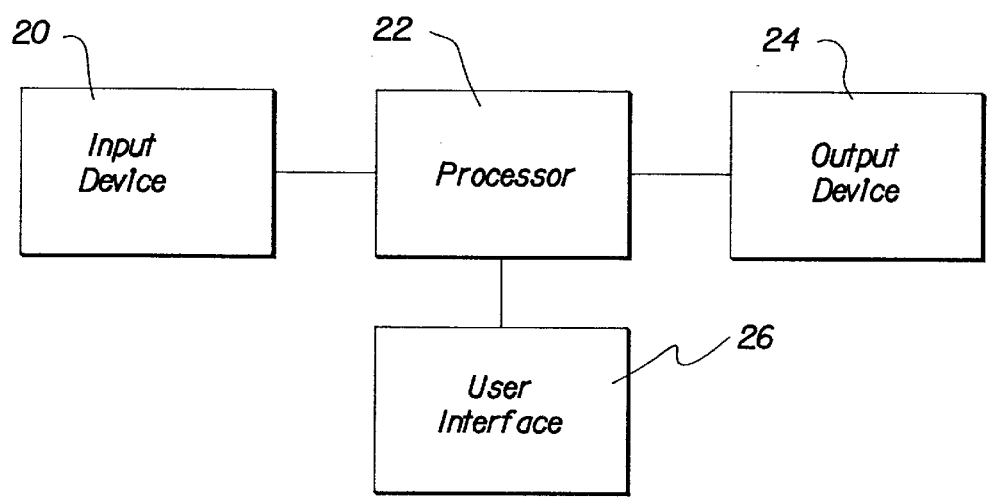
FIG. 2 depicts hardware components of which can be used in an embodiment of the present invention.

FIG. 2 illustrates one way the present invention could be implemented. An input color device 20, such as a conventional computer monitor, which displays input color values of an image, such as a picture captured with a video camera, in some input color space, such as monitor RGB, is connected to a processor 22. The processor 22 interacts with an interactive user interface 26, such as a conventional interface which is capable of accepting inputs from users, either via a regular keyboard and/or a two- or three-dimensional means of selection (e.g., mouse, joystick, trackball, data glove, etc.), or a combination of both to specify the transformation constraints. The processor 22 and interface 26 could comprise a conventional desk top computer and its operating system with associated utilities. The processor 22 is also connected to an output device 24, such as a conventional color printer, which processes the output color values produced by the processor 22 in an output color space, such as CMY for printers.

The processor 22 also includes a storage medium, such as a hard disk, in which the transform can be stored for later retrieval and use. Of course the transform can be stored on a portable media, such as a floppy disk and carried or transmitted to another processor where it is retrieved and used for performing transformations.

The preferred embodiment of the present invention involves transforming color images displayed on an RGB video monitor into images for printing on a CMY(K) color printer. It should be apparent, however, that this invention can be adapted easily to other color conversion problems such as between printer spaces which used different inkings.

Figure 3:
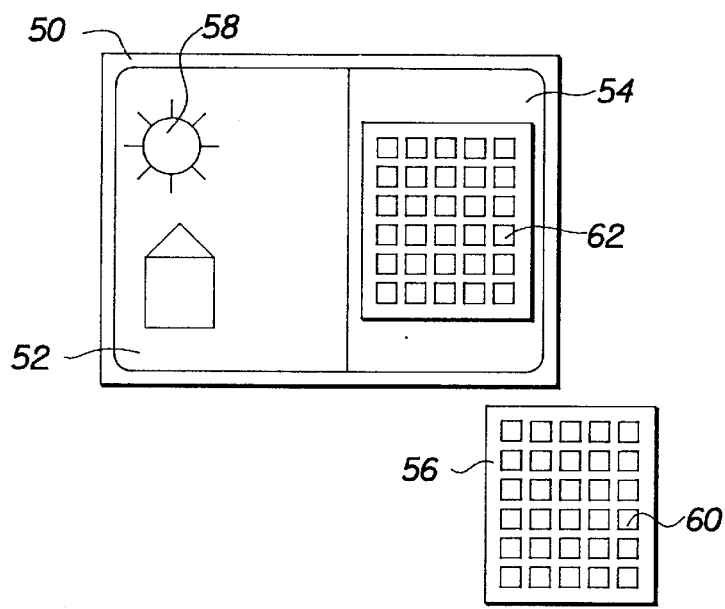
FIG. 3 depicts a display and set of color patches that can be used by a user to interactively specify the constraints in accordance with the present invention.

The color interactive transformation modifications embodied in the present invention comprises a five step process which will be discussed in more detail with respect to FIGS. 3 and 4. First, the input and output color spaces have to be specified. Second, the user is given the choice of manually choosing specific input color values to be mapped to specific output color values. Third, upon completion of the selecting of the user-defined constraints, the user can choose any of the built-in color mapping strategies. Of course this step could be first rather than third. Fourth, the system forms a transform of the remaining (unspecified) colors using a built-in interpolation scheme. Finally, all the input color values in the input color space are transformed to output color values in the output color space using the transform described above. Once the transformation of the input color values into output color values is complete, the output color values can be reproduced on the targeted color output device, thereby reproducing input images on the output device in a way that satisfies the users subjective needs.

The first step 30 of the process (see FIG. 4) specifies the input color values in the input color space and the device-dependent output color values in the output color space where it is possible that the input and output spaces can be the same space. This step includes not only specifying the color spaces, such as RGB and CMY, but also designates a default color transformation which will be used as an initialization of the color transformation. This transformation will then be perturbed by the constraints applied in the following steps. For example, the default color transformation might be a simple colorimetric match of the input and output colors or it might be an initial "factory defined" color transformation created with the method described in the Method for Cross-Device Color Calibration And Enhancement Using Explicit Color Constraints previously mentioned. This step sets up an initial transformation between input color values and the output color values which can be modified by the user to provide a custom color transformation.

In the second step 32, the user chooses or picks one of the input colors, or a subset of input colors, either by pointing to a region on the input image using a mouse, etc., or by specifying an explicit RGB value. The system then queries the user as to which of the output color values, or set of output color values, he or she wants the chosen input color or set to be mapped and allows the user to specify 34 the corresponding desired output color or set. The input color values can be realized either as RGB values on the monitor or as an on-line list of RGB values. The output color values can be realized either as printed color patches in the form of a menu of representative color patches printed on the color printer or as an on-line list of CMY(K) values. An example of the preferred embodiment for the displays etc. of this step is illustrated in FIG. 3 in which a monitor display 50 is divided into two parts: on the left-hand side, the input image 52 is displayed, and on the right-hand side, a map of color patches 54 is displayed. In addition, the user can view a printed color reproduction 56 of a large number of patches which the output device (printer in this example) can reproduce. This printed reproduction 56 corresponds to the color patches 54 displayed on the monitor 50. If the CMY(K) values are in the range 0 to 255, then the patches could be in increments of 5 units for each of the dimensions, i.e., Cyan (C), Magenta (M), Yellow (Y) and Black (K). Because this fine of an increment between patches would produce 148,877 patches, a coarser increment would probably be preferred or a pan-zoom mechanism to allow focusing on specific screen patches 54. An example of such interaction can be to constrain the color reproduction of a corporate trademark color, such as Eastman Kodak Co. trade dress yellow. The user chooses a patch in the input image 52 which represents that color, and points to a corresponding patch from the menu of color patches 54 which he or she thinks to be the best visual match to the Kodak trade dress yellow. Consider the following additional example: the user wants the color value of the sun in the input image to match a patch corresponding to the desired printer yellow. Referring to FIG. 3, the user chooses 32 the sun 58 as it appears on the input image 52, finds a patch 60 corresponding to desired printer yellow in the printed ensemble 56, and "clicks on" 34 the corresponding patch 62 on the right-hand side 54 of the monitor 50. This defines a new constraint specifying that any input color that matches the color of the sun selected in step 32 is to be transformed into the patch color selected in step 34. Using the same example, but applying a different selection mechanism, the user may know what the RGB value of the sun 53 in the input image 52 is, and what the CMY value of the desired output color is on the output device and the system can allow the user, via a menu, to select (32) an RGB on the input side, and associate it (34) with a CMY on the output side, thus defining the new constraint. Other methods of selection of the points that define the constraint are also applicable, such as providing an ordered list. The particular selection mechanism should be matched to the particular requirements of the user. These steps 32 and 34 can be repeated 36 numerous times for every desired input color region the user wishes to constrain and map to an output color patch.

Once the user-driven constraints are defined, the next step 38 in the mapping process can be for the system to offer the user some additional built-in mapping strategies, from which the user can select, to apply to specified subsets of points to customize particular regions of color space. Examples of these strategies can be: (1) maintaining the neutral color values; and (2) maintaining saturation of highly saturated input color values. Some typical mapping strategies are discussed in the previously mentioned Method And Associated Apparatus For Transforming Input Color Values In An Input Color Space To Output Color Values In An Output Color Space.

Once the set of constrained colors, as well as the color mapping strategy for those constrained colors, has been defined, the color mapping for the remaining colors, particularly those colors close to the constrained colors, must be determined 40. These are the colors outside the set of constrained colors. For colors near the constrained color values, the color mapping must be modified to provide a smooth transition to the constrained color values. In general, colors far from the constrained points will change less than colors near a constrained point.

Several techniques could be used to calculate and provide this smooth transition to the constrained points that vary in the complexity of implementation, and the smoothness and acceptability of the results. Some of the simplest strategies include multi-dimensional interpolation techniques, such as trilinear or tetrahedral interpolation. (For example, see: John R. D'Erico, Color image reproduction apparatus having a least squares look-up table augmented by smoothing, U.S. Pat. No. 4,941,039, Jul. 10, 1990; K. Kanamori and H. Kotera, "Color correction technique for hard copies by 4-neighbors interpolation method", J. Imag. Sci. Technol. Vol 36, pp. 73–80 (1992); and S. Wan, R. Miller, and J. Sullivan, Convex interpolation for color calibration, U.S. application Ser. No. 08/068,823, Kodak docket no. 66,875 (1993)), all incorporated by reference herein. Generally, these techniques have been developed for the calibration of a device from experimentally measured data, but they could be adapted by a person of skill in the art to handle the present color enhancement algorithm as well.

The preferred method used in the present invention applies a technique similar to the computer graphics shape transformation technique (generally referred to as "morphing", see T. Beier and S. Neely, "Feature-Based Image Metamorphosis, Computer Graphics, Vol. 26, No. 2, Jul. 1992, pp. 35–42), to determine the unconstrained points in the transition region. Such a technique allows for points in the input color space to be mapped smoothly and continuously. The preferred morphing technique minimizes the value of a cost function calculated from the color differences between nearby color values. The cost function is formulated to maximize local continuity and smoothness in the color mapping function. For more details concerning the preferred morphing technique see Method For Cross-Device Color Calibration And Enhancement Using Explicit Constraints previously mentioned.

The above step 40 produces a modified general transformation from the input color values to the output color values. Of course if the constraint specification specifies that the color will be outside of the gamut of the target device, an appropriate gamut mapping procedure is applied. The effects of this transformation are evaluated 42 by, for example, printing a portion of the input image and visually reviewing it to determine whether it is subjectively satisfactory. If not satisfactory 44 further modifications can be performed. Once the transformation is found to be satisfactory, the transformation can be stored 46 and used directly to convert 48 an entire input image and its associated input color values to an output image (or print) with its associated color values, or it can be delivered as a look-up table to another process (e.g., printer) which will use this transformation every time a mapping between the input device and the output device is required.

Figure 4:
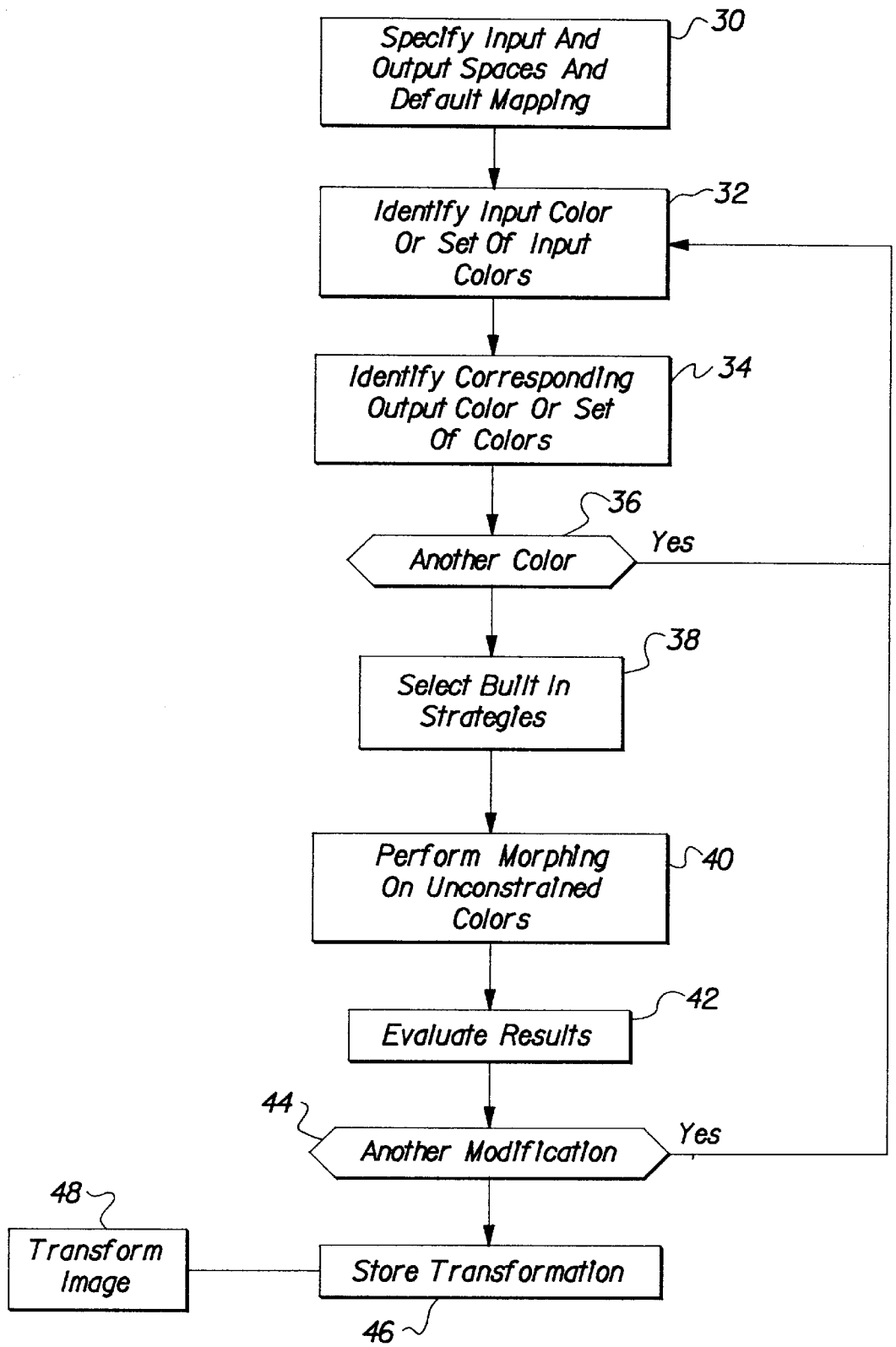
FIG. 4 is a flowchart of the steps performed in the process of the present invention.
Figure 5C:
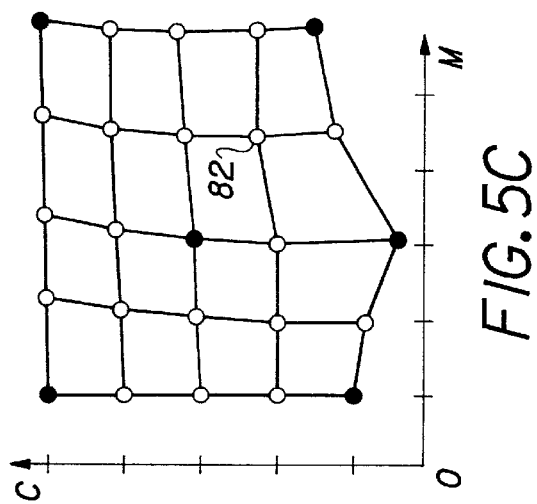
FIGS. 5A, 5B and 5C graphically illustrate modification of a general transform using constraints.
Figure 5B:
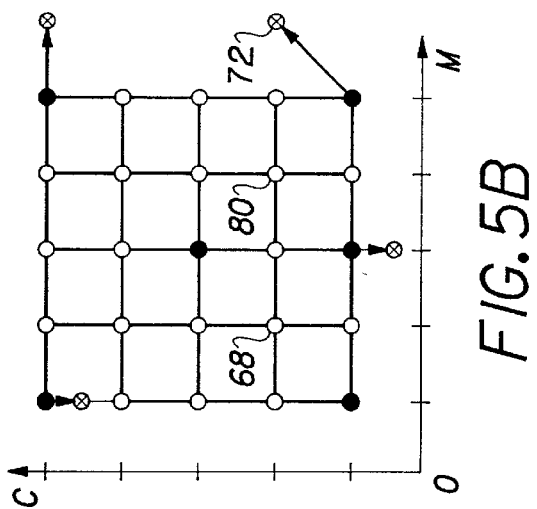
Figure 5A:
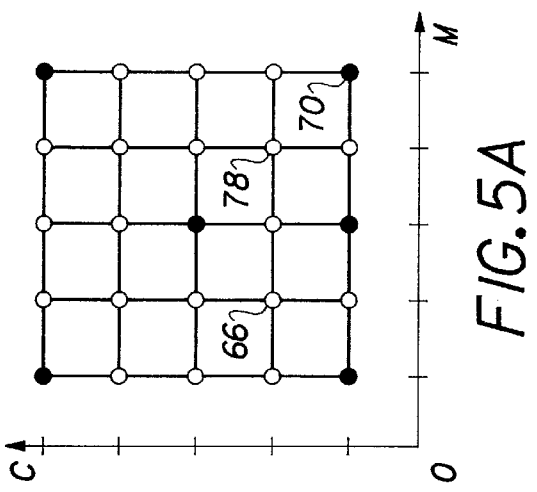

The process of FIG. 4 is represented graphically in FIGS. 5A, 5B and 5C. In FIG. 5A the lattice indices would be determined by the input control values and the position of the nodes would be determined by the default mapping. For example, the second lattice column may correspond to an input value of R=50 and the spatial location of the nodes in that column represent the CMY values corresponding to the default color mapping for each lattice point. FIG. 5B illustrates applying constraints to certain nodes to alter the default mapping at those locations. In FIGS. 5A and 5B the open circle nodes represent unconstrained color values and the solid circle nodes represent color values that have been constrained in the selection process of the present invention. The arrows in FIG. 5B represent the direction and distance that the corresponding color values in the output space have been moved when the user designates the constraints by picking the corresponding colors in the output space while the crossed circles indicate the corresponding color selection in the output space. For example, the user would select the color point in the input space corresponding to node 70 (FIG. 5A) in step 32 and then select the position of node 72 (FIG. 5B) in step 34 as the corresponding color value in the output space. The remaining solid and crossed nodes represent the pair selections. When the operation of step 40 is performed on the transformation defined by the regular mapping using the constraints defined by the solid and crossed circles of FIG. 5B, the rearranged node arrangement of the output color values in the output color space of FIG. 5C results. That is, the mapping from FIGS. 5A to 5C represents the modified transformation produced by applying the constraints to the defined, built-in or default transformations. The new spatial location for each node corresponds to the new transformation determined for the lattice point values. As a result, a color in an input image output which would normally be transformed into a color in the output space using the default transformation instead of being transformed into a color value such as point 80 (FIG. 5B) will be transformed into color value 82 (FIG. 5C). All the nodes in FIG. 5C which have been displaced with respect to the corresponding nodes in FIG. 5B represent nodes in the transition region. The entire transformation is modified in this way.

Figure 6A:
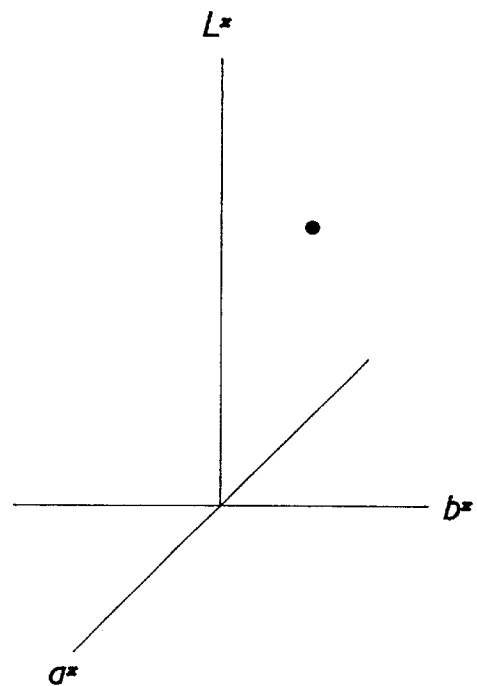
FIGS. 6A, 6B, 6C and 6D graphically illustrate constraints.
Figure 6B:
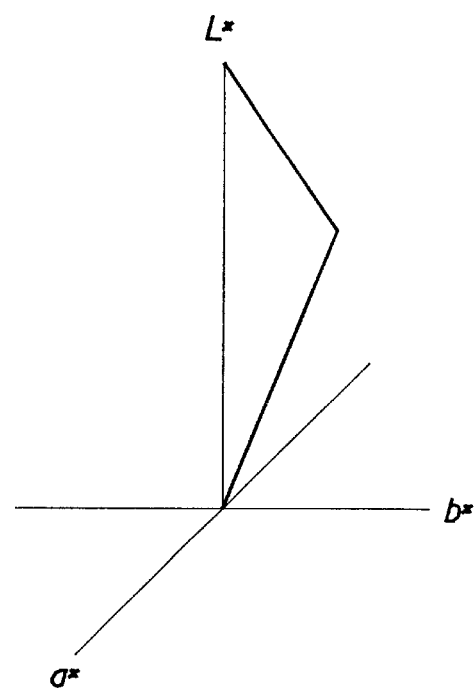
Figure 6C:
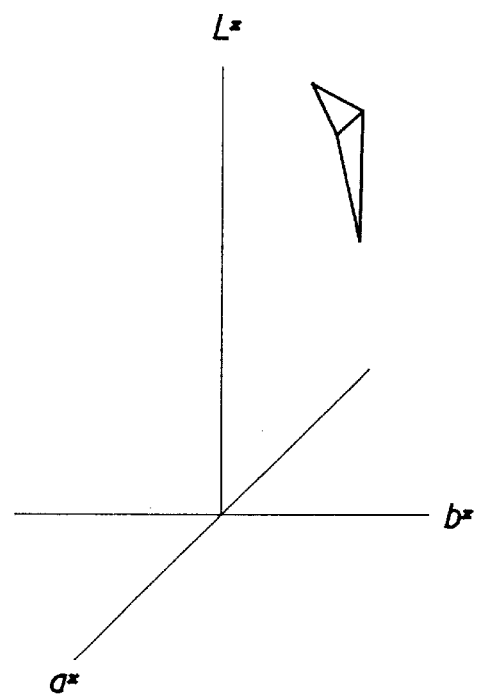
Figure 6D:
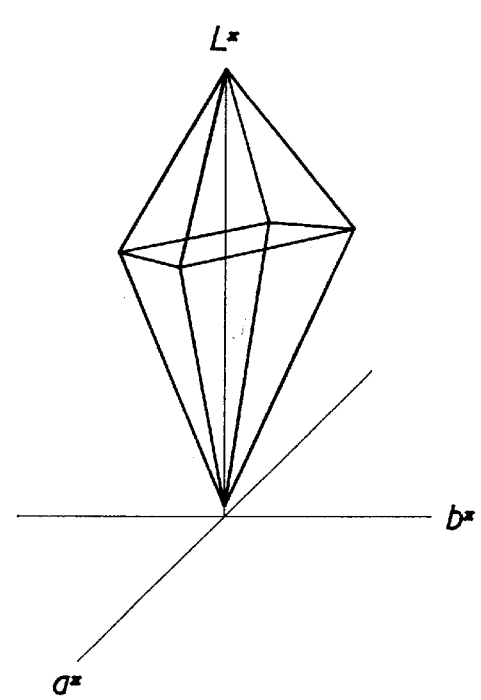

The present invention can also be used to constrain regions of color space rather than just points in color space. FIGS. 6A–6D illustrate several different types of constraint regions. FIG. 6A shows the simple point constraint which specifies the mapping for a single input color value. FIG. 6B illustrates a line constraint. This could be used to constrain the neutral axis, or a shadow or highlight series for a particular surface color. FIG. 6C shows a surface constraint. For example, this could be used to constrain the exterior surface of the color gamut or an interior surface which delineates regions of the color space and acts as a boundary beyond which changes induced by other constraints cannot propagate. FIG. 6D illustrates a volume constraint. This could be used to constraint the set of all colors with low saturation, or colors within the convex hull of all skintone colors, etc. Once all of the constrained regions have been defined, the remaining unconstrained points are determined as described above. Any or all of these types of regions could be used in some specific application, and different transformations could be specified for every region. For example, the neutral axis and volume of skintones could be constrained to be reproduced colorimetrically, the gamut surface could be specified using a color mapping technique, such as that described in Method And Associated Apparatus for Transforming Input Color Values In An Input Color Space To Output Color Values In An Output Color Space, and several point constraints could be interactively specified using the selection means described above.

The advantage of the method for color space mapping of the present invention using an interactive system for user-defined constraints is that it allows all of the colors in one color space to be mapped to another color space by specifying only a small set of constraints. Once these constraints are specified, the remainder of the colors can then be determined using some predefined mapping strategies. The specification of the constrained points allows maximum flexibility in the color mapping process. Some colors can be reproduced with large color shifts, while others can be reproduced with no perceived color shift at all.

The capability to interactively define the input color values which are to be mapped to the output color values is a substantial advantage over many conventional techniques as they involve defining color mapping functions that operate on the various color channels of the input space using some series of functions, matrices and/or look-up tables. With those techniques, changes made in one region of the color space will often affect many other parts of the color space as well. This reduces flexibility in the definition of the color mapping.

Finally, this capability is more flexible than previous techniques for cross-device color mapping since it provides an interactive means to build a new look-up table to transform color values which can vary with every input image. Therefore, one look-up table which may be suitable for one or several images can be reconstructed to suit a different set of images, as per user demand.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

REFERENCE NUMERAL LIST

10 General transformation
20 Input device
22 Processor
24 Output device
26 User interface
30 Specify spaces and default mapping
32 Identify input color
34 Identify output color
36 Color test
38 Select strategy
40 Perform morphing
42 Evaluate results
44 Modification test
46 Store
48 Transform
50 Display
52 Left side
54 Right side
56 Printed color patches
58 Sun
60,62 Patch
66,68,70,72,80,82 Color space nodes

What is claimed is:

1. A method, comprising:
  a. designating a multi-dimensional transformation for transforming input color space values into transformed output color space values;
  b. interactively user specifying a transformation constraint for a subset of input color space values, wherein some input color space values are moved to specified modified output color space values and output color space values for some other input color space values may be constrained as non-moving; and
  c. then modifying the multi-dimensional transformation from step a for the input color space values not constrained in step b, to maintain continuity with the constrained transformation values.

2. A method as recited in claim 1, further comprising d. transforming input image color values in the input color space into output image color values in the output color space via the modified transformation.

3. A method as recited in claim 2, wherein the transformation constraint comprises a constraint input color value in the input color space and a corresponding constraint output color value in the output color space, and said transforming performing transformation of the input image color values matching the constraint input color value into the constraint output color value.

4. A method as recited in claim 1, wherein said modifying morphs or interpolates the multi-dimensional transformation.

5. A method as recited in claim 1, wherein said transformation constraint specifies one of a point, a line, a region, a surface and a volume constraint.

6. A method as recited in claim 1, wherein the modified transformation is stored in a storage media.

7. A method as recited in claim 6, wherein the modified transformation is read from the storage media and used for color value transformation.

8. A method, comprising:
  a. designating a general multi-dimensional transformation for transforming input color space values into transformed output color space values;
  b. interactively specifying specific transformations for subsets of the input color space values, wherein some input color space values are moved to specified modified output color space values and output color space values for some other input color space values may be constrained as non-moving; and
  c. then modifying the general multi-dimensional transformation from step a for input color space values not in the subsets of the specific transformations to maintain continuity with the specific transformations.

9. A method of interactive image transformation modification, comprising:
  a. designating a defined transformation for transforming color values in the image from a first color space to a second, different color space;
  b. interactively user designating an input color value constraint in the input color space and a corresponding output color value constraint in the output color space requiring color values in the image matching the input color value constraint to be transformed into corresponding output color value in the output color space, wherein some input color space values are moved to specified modified output color space values and output color space values for some other input color space values may be constrained as non-moving;
  c. morphing the defined transformation responsive to the input and output color value constraints so that unconstrained points are mapped for maintaining continuity of the output color space values; and
  d. transforming the image in the input color space into an output image in the output color space using the morphed defined transformation.

10. A method of modifying a color transformation, the method comprising the steps of:
  a. designating a color transformation from a set of first device color values to a corresponding set of second device color values;
  b. manually user specifying a color mapping for specific first device color values which are a subset of the first device color values, to specific second device color values, wherein some first device color values are moved to specified modified second device color values and second device color values for some other first device color values may be constrained as non-moving; and
  c. modifying the color transformation for the first device color values not in the subset of the first device color values for maintaining continuity with the manually user specified color mapping.

11. A method as recited in claim 10, transferring the image from the first color device to the second color device using the modified transformation.

12. A method, comprising:
  a. defining a multi-dimensional transformation between first and second color spaces;
  b. defining constraint points in the first and second color spaces, wherein some first color space values are moved to specified modified second color space values and second color space values for some other first color space values may be constrained as non-moving; and c. then modifying the multi-dimensional transformation from step (a) for input color space values not constrained in step b., to produce a smooth transition to the constrained points.

13. A method, comprising:

a. specifying a first multi-dimensional color transformation between first and second color spaces;

b. interactively specifying a constraint transformation between the first and second color spaces for a subset of color values in the first color space, wherein some first color space values are moved to specified modified second color space values and second color space values for some other first color space values may be constrained as non-moving; and c. then modifying the first color transformation from step a for color values not in the subset and providing continuity with the constraint transformation.

14. A method as recited in claim 13, wherein step c further comprises smoothly performing a transition between the subset and the first color transformation.

15. An apparatus, comprising:

an interactive interface interacting with a user to designate transformation constraints for a subset of input color space values of a defined multi-dimensional transformation, wherein some input color space values are moved to specified modified output color space values and output color space values for some other input color space values may be constrained as non-moving; and a processor modifying the defined multi-dimensional transformation for the unconstrained input color space values, after the user has designated the transformation constraints, responsive to the transformation constraints.

16. An apparatus as recited in claim 15, wherein said processor performs transformations of input color values into output color values responsive to the modified transformation.

17. An apparatus as recited in claim 15, wherein said processor stores the modified transformation on a storage media.

18. An apparatus, comprising a storage media including a multi-dimensional input color space to output color space transformation user interactively modified by a user specified transformation constraint for a subset of input color space values, wherein some input color space values are moved to specified modified output color space values and output color space values for some other input color space values may be constrained as nonmoving, and further wherein input color space values not constrained by the transformation constraint are modified, following the user specifying the transformation constraint, to maintain continuity with the constrained transformation values.

19. An apparatus as recited in claim 18, further comprising a processor reading the transformation from said media and transforming color values from a first color space to a second color space using the transformation.

* * * * *